Sept. 10, 1946.     W. J. O'BRIEN     2,407,323
METHOD AND APPARATUS FOR RECEIVING RADIO SIGNALS
Original Filed Dec. 23, 1941
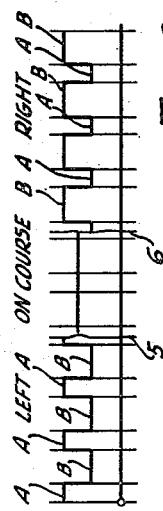
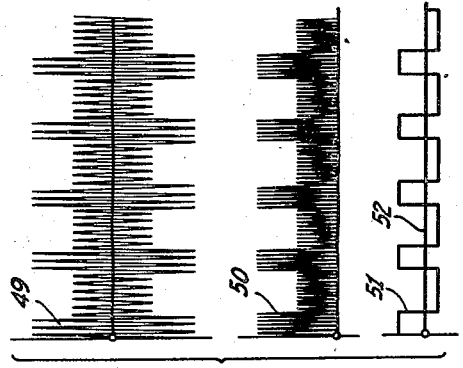
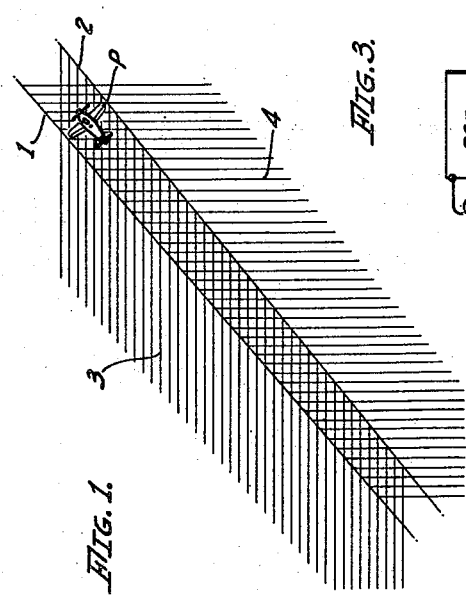
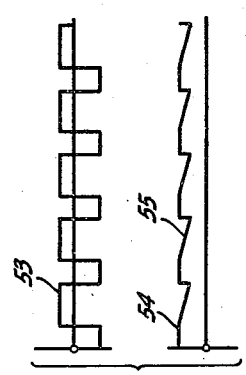
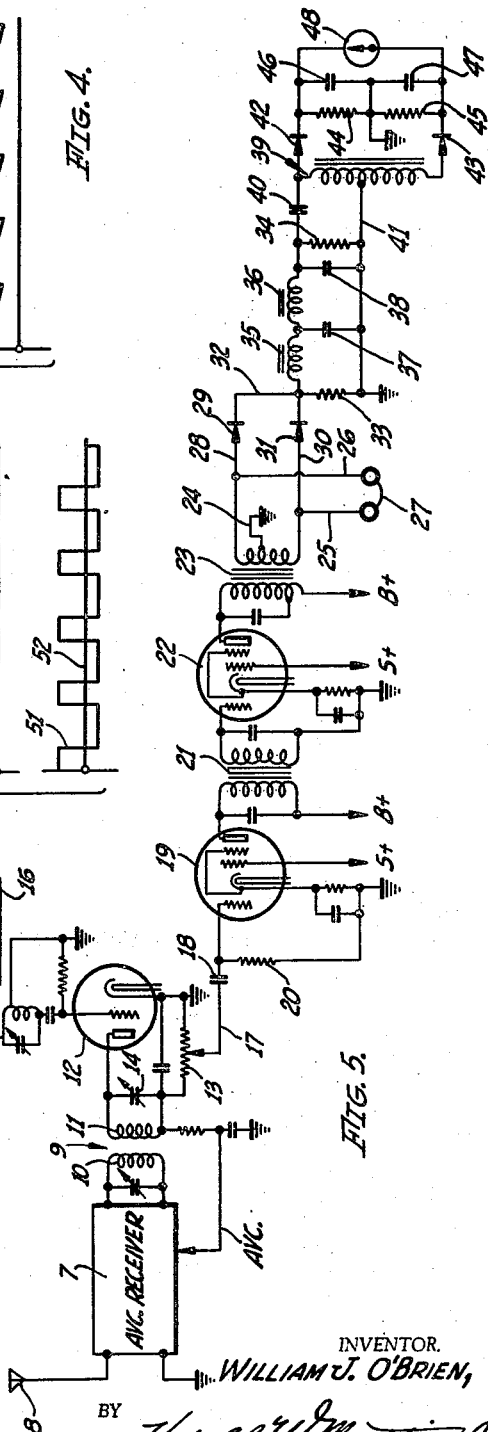
INVENTOR.
WILLIAM J. O'BRIEN,
BY
ATTORNEY.

Patented Sept. 10, 1946

2,407,323

UNITED STATES PATENT OFFICE 2,407,323

METHOD AND APPARATUS FOR RECEIVING RADIO SIGNALS

William J. O'Brien, London, England, assignor to The Decca Record Company, Limited, London, England, a corporation of Great Britain Original application December 23, 1941, Serial No. 424,159. Divided and this application November 8, 1943, Serial No. 509,443

5 Claims. (Cl. 250—11)

My invention relates to radio beacon systems and has particular reference to a radio receiving and indicating apparatus which finds particular utility when employed with an equi-signal type of beacon system.

This is a division of my copending application Serial No. 424,159, filed December 23, 1941 and entitled "Receiving apparatus for radio beacon systems."

Equi-signal beacon systems operate to generate a field strength pattern which includes a line along which the signal intensity of two groups of radio transmitters are equal, which line is the "course" defined by the beacon and along which it is intended that the aircraft or other vehicle be maneuvered.

The signals from the two groups of transmitters are rendered distinguishable either by modulating the signals at different audible frequencies or by keying the two groups of transmitters off and on alternately and in a distinguishable time sequence, the presently employed arrangement being that in which one group of transmitters is keyed with the international Morse code signal for A while the other is alternately keyed N. In either event the "on course" position of the vehicle is indicated by the reception at the vehicle of signals of equal intensity from the two groups of transmitters and an "off course" location is indicated by the predominance of one signal over the other.

In both of these types of equi-signal beacon systems the signals are perceived audibly with the result that extraneous noises such as static and other radio interference tends to make it more difficult to distinguish between the signals. Audible perception of the signals requires that the pilot of the aircraft or other vehicle wear headphones or similar devices and also requires the pilot to consciously direct his attention to distinguishing the signals with the result that the pilot's freedom of movement is impaired and his attention is diverted from the control and from the navigation instruments.

The desirability of providing for a visual perception of the beacon signals has long been recognized and while attempts have in the past been made to realize this desideratum, no one prior to my invention has provided a satisfactorily operating device. The modulating of the signals at different audible frequencies represents one such attempt, these different frequencies being applied to vibrating reeds in the belief that a comparison of the amplitudes of the vibration of the reeds would provide an indication of the relative strengths of the signals. This expedient was not satisfactory because of the necessity of providing suitable audio frequency generating and modulating mechanism for the beacon transmitters and because of the liability of the reeds geting out of order through mal-adjustment or injury, the reeds of necessity being very delicate and lacking in mechanical strength. Furthermore, it was found tht the indication given was so coarse as to make it extremely difficult for a pilot to keep his craft "on course" without having recourse to earphones, whereupon all of the hoped for advantages were lost.

It is, therefore, an object of my invention to provide a receiving apparatus for use with radio beacon systems of the equi-signal type which overcomes the above noted disadvantages by providing a visual indication of the location of a vehicle equipped with the apparatus relative to a course defined by the beacon system.

It is also an object of my invention to provide a receiving apparatus of the character set forth in the preceding paragraph in which the indicating portion of the apparatus is highly sensitive and operates to positively indicate visually small departures of the vehicle from the defined course.

It is an additional object of my invention to provide an apparatus of the character set forth hereinbefore in which the received signal is rectified and the polarity of the peak of the resulting signal is employed to indicate the position of the vehicle relative to the course.

It is also an object of my invention to provide a method of visually indicating the position of a vehicle with respect to a course defined by a radio beacon of the equi-signal type which consists in rectifying the beacon signals to produce a current of complex wave form alternating in accordance with the keying of the beacon transmitters and ascertaining the polarity of the maximum peak current.

Other objects and advantages of my invention will be apparent from a study of the following specifications, read in connection with the accompanying drawing, wherein:

Fig. 1 is a diagrammatic view illustrating an aeroplane as proceeding outwardly along an "on course" zone of equal signal intensities such as is produced by a radio beacon system of the equi-signal type, the shaded areas on either side of the "on course" zone representing the areas in which one of the beacon signals predominates in intensity over the other beacon signal;

Fig. 2 is a graph illustrating the way in which the relation between the intensities of the two groups of beacon signal varies with changes of the position of the vehicle with respect to the "on course" line defined by the beacon;

Fig. 3 comprises a group of charts or graphs indicating the character of the received beacon signals at various stages in the progress of the signals through the receiving apparatus of my invention;

Fig. 4 comprises a series of graphs or charts indicating the character of the signals at points in the receiving apparatus subsequent to those represented in Fig. 3; and Fig. 5 is a wiring diagram schematically illustrating one form of receiving apparatus constructed in accordance with my invention.

Referring to the drawing, I have illustrated in Fig. 1 an aeroplane P or other vehicle as being guided outwardly along an "on course" zone which is bounded in Fig. 1 by the lines 1 and 2. This zone comprises that area immediately adjacent a line of equal signal intensity with respect to independent radio frequency signals emanated from two groups of radio transmitters.

The type of radio beacon transmitting equipment employed for producing an equi-signal "on course" zone is well known and forms no part of the present invention. For a detailed explanation of such a radio beacon system reference may be had to the Bureau of Standards Journal of Research for January, 1933, vol. 10, page 7. Such a system operates to produce within the zone bounded by the lines 1 and 2 separate radio frequency signals of equal intensity, whereas in the zone indicated generally by the reference character 3 and lying to the left of the line 1, one of the beacon signals will predominate in intensity over the other, whereas in the zone indicated generally by the reference character 4 and lying to the right of the line 2, the other radio beacon signal will predominate over the first-mentioned signal.

In accordance with my invention the radio beacon transmitters are preferably keyed "off" and "on" to provide for the distinguishing of one set of radio frequency signals from the other set. This keying is so arranged that one of the radio frequency signals is present during the time the other is absent and vice versa. Furthermore, one of the signals is caused to be radiated for a relatively short time, whereas the other is caused to be radiated for a relatively long time in each cycle.

This condition is graphically illustrated in Fig. 2 wherein the relative signal intensities are plotted as ordinates and time is plotted as abscissa. That portion of the chart lying between the origin and the wavy line 5 represents the signals which are received at the plane P when that plane is in the "off course" zone 3.

It will be noted that the signals received at the plane P comprise high intensity peaks A of relatively short duration and low intensity signals B of relatively long duration. The peak signals A will hereinafter be referred to as being the A signals, whereas the signals of longer duration will be hereinafter referred to as the B signals.

As the plane P moves nearer and nearer to the "on course" zone, the intensity of the A signals will decrease while the intensity of the B signals will increase until these A and B signals are of equal intensity when the plane is in the position illustrated in Fig. 1. When this condition obtains, the signals received at the plane are equal and indistinguishable as is indicated in Fig. 2 in that portion lying between the wavy lines 5 and 6. If, on the other hand, the plane P is positioned to the right of the "on course" zone and in the zone 4, the relative intensities of the signals will be reversed from that previously described with the result that the B signals will predominate in intensity over the A signals as is illustrated in Fig. 2 by that portion of the figure disposed to the right of the wavy line 6.

The receiving apparatus comprising the preferred form of my invention is illustrated diagrammatically in Fig. 5 as comprising an ordinary radio frequency receiver and amplifier indicated generally by the rectangle bearing the reference character 7, this receiver being adapted to pick up the A and B signals as by means of a suitable antenna 8.

The amplified output of the receiver 7 is coupled by means of a coupling transformer 9 including a tuned primary winding 10 and a tuned secondary 11 to a grid controlled rectifier tube 12. The signal voltage developed across the winding 11 is applied between the plate and cathode of the tube 12, the cathode return circuit including a resistance 13 shunted by a condenser 14.

The grid to cathode circuit of the tube 12 is preferably coupled as by means of a suitable coupling transformer 15 to a radio frequency oscillator of any suitable type represented diagrammatically by the rectangle 16. The oscillator is adjusted to produce a radio frequency current which differs in frequency from the frequency of the received A and B signals by an amount adapted to produce a beat frequency signal which is preferably, although not necessarily, within the audible range.

Since the high frequency produced by the oscillator 16 is applied between the grid and the cathode of the tube 12 and since the received A and B signals are applied between the plate and cathode of the tube 12, the tube 12 will operate to rectify the voltage appearing across the winding 11 only at such time as the grid and plate are both positive with respect to the cathode. The tube 12 will accordingly produce in the resistance 13 a pulsating direct current, which pulsations have a frequency equal to the difference in frequency between the signal produced by the oscillator 16 and the frequency of the received A and B signals. If desired, the negative potential produced on the plate of the tube 12 may be used for the purpose of the automatic volume control in the receiver 7 as by connecting the plate circuit for the tube 12 to the grid circuits of the various tubes employed in the amplifier 7 through an automatic volume control bus AVC.

The resistance 13 preferably comprises a potentiometer, the arm portion of which is connected as by means of a conductor 17 through a blocking condenser 18 to the grid of an amplifier tube 19. The grid of the tube 19 is maintained at a direct current ground potential as by connecting the grid to ground through a grid resistance 20. The tube 19 is employed as a voltage amplifier and is coupled through a suitable coupling transformer 21 to the input circuit of a power amplifier tube 22 whose output appears across the secondary of an output transformer 23.

In Fig. 5 the heater circuits have been omitted as have the plate supply and screen supply circuits for the tubes 19 and 22 since these circuits are well known in the art and form no part of the present invention.

The secondary of the transformer 23 is preferably grounded at a mid tap as by a conductor 24, whereas the ends of the windings may be connected as by means of conductors 25 and 26 to headphones or other suitable audio frequency responsive means 27 if it is desired to permit the pilot of the plane P or other vehicle to perceive the signals A and B audibly.

One end terminal of the secondary of the transformer 23 is preferably connected as by means of a conductor 28 to a half wave rectifier 29, whereas the other end terminal is connected as by means of a conductor 30 to a half rectifier 31, the cathodes of the rectifiers 29 and 31 being interconnected as by means of a conductor 32 which is in turn connected to ground through a resistance 33.

The voltage which may be produced across the resistance 33 may also be transmitted to a resistance 34 through a low pass filter including series connected inductances 35 and 36 and shunt connected condensers 37 and 38. Such voltage as may appear across the resistance 34 is applied to the primary portion of the winding of an auto-transformer 39 through a condenser 40, the mid tap of the auto-transformer winding being grounded as by means of a conductor 41.

The end terminals of the auto-transformer windings are connected, respectively, to the anodes of half wave rectifiers 42 and 43, the cathodes of these rectifiers being connected to ground, respectively, through resistances 44 and 45. The resistances 44 and 45 are preferably shunted by condensers 46 and 47, respectively. The cathodes of the rectifiers 42 and 43 are furthermore interconnected by a galvanometer 48 which is preferably of the zero center type and of the current responsive type having a very low internal resistance.

The manner in which the above described apparatus operates to provide a visual indication of the location of the plane P with respect to the "on course" zone may best be had by assuming certain operating conditions and describing the operation of the apparatus in connection with the explanatory drawing, Figs. 3 and 4.

If it be assumed that the plane P is to the left of the "on course" zone and in the area indicated generally by the reference character 3, the signals received at the plane P by the antenna 8 will be such as are represented by that portion of Fig. 2 lying between the origin and the wavy line 5; that is, the A signals will predominate in intensity over the B signals. The output of the receiver 7 will, therefore, correspondingly fluctuate and these fluctuations will likewise appear in the intermediate or audible beat frequency which is amplified by the amplifier tubes 19 and 22. The voltage appearing across the secondary of the output transformer 23 will, therefore, be such as that represented by the sine curve 49 in Fig. 3.

It will be noted that this curve varies in amplitude in accordance with the relative amplitudes of the A and B signals. The curve 49, therefore, represents the voltage which is applied to the rectifiers 29 and 31 which operate as full wave rectifiers to cause a direct current to flow through the resistance 33. The curve 50 shown in Fig. 3 represents the voltage which appears across the resistance 33.

The filter comprising the inductances 35—36, the condensers 37—38 and the resistance 34 operates to exclude the high frequency component of the pulsating voltage represented by the curve 50. The condenser 40 serves to isolate the winding of the auto-transformer 39 with respect to direct current with the result that there is applied to the primary portion of this winding an alternating voltage such as that illustrated by the curve 51 in Fig. 3.

Attention is directed to the fact that by eliminating the high frequency component and the direct current component from the voltage which is applied to the primary portion of the winding of the auto-transformer 39, the axis 52 of zero voltage is automatically caused to assume a position in which the area embraced between the positive portions of the alternating current wave and the axis is equal to that embraced between the negative portions of the alternating current and such axis. Thus, the peak value of the positive half cycle will bear the same ratio to the peak value of the negative half cycle as does the duration of the B signal to the duration of the A signal.

As previously noted, the B signal is of relatively long duration while the A signal is of relatively short duration so that the positive half cycle of the voltage represented by the curve 51 will have a peak value considerably exceeding the peak value of the negative half cycle. This voltage is accordingly applied to the rectifier 42, being the voltage which is applied across the primary portion of the winding of the auto-transformer 39. The voltage which is developed by the other half of the winding of the auto-transformer 39 is, of course, 180° out of phase with respect to the voltage which is applied to the primary portion of this winding. This out of phase voltage may accordingly be represented by the curve 53 of Fig. 4. It will be noted that the voltage which is applied across the rectifier 42 and the resistance 44 is the voltage represented by the curve 51, whereas the voltage which is applied across the rectifier 43 and its resistance 45 is the voltage which is represented by the curve 53.

The rectifier 42 will pass current during the time the plate thereof is positive with respect to the cathode and this current will flow through the resistance 44 tending to make the cathode of the rectifier 42 negative with respect to ground.

The ohmic value of the resistance 44 and the capacity of the condenser 46 is so chosen as to maintain the voltage of the cathode of the rectifier 42 substantially constant with respect to ground. That is to say, during the relatively short intervals that the high positive peak voltage of the curve 51 is applied to the rectifier 42, the voltage which appears across the resistance 44 and condenser 46 is of a corresponding magnitude and may be represented by the short horizontal line portions 54 of the lower of the two curves illustrated in Fig. 4. During the following negative half cycle, the rectifier will, of course, pass no current with the result that the condenser 46 will discharge its stored energy through the resistance 44 and the voltage measured between the cathode of the rectifier 42 and ground will gradually diminish as is represented by the sloping line 55 in Fig. 4. As soon as the plate of the rectifier 42 again swings positive, the voltage across the resistance 44 will immediately rise to the straight line value 54.

It will be recalled that the cathode of the rectifier 42 is directly connected to the cathode of the rectifier 43 through the low resistance galvanometer 48 so that the cathodes of the two rectifiers are maintained at substantially the same potential with respect to ground. This negative potential will exceed the positive peak value of the voltage which is applied to the plate of the rectifier 43 as may be readily seen by comparing the amplitude of the curve 54—55 with the amplitude of the positive half cycle portions of the curve 53 in Fig. 4. Thus the rectifier 43 will be blocked and will pass no current.

Similarly, the galvanometer 48 serves to connect the resistance condenser combination 45—47 in parallel with the resistance condenser combination 44—46 so that the current which flows from the plate to the cathode of the rectifier 42 will divide, half flowing through the resistance 44 and half flowing through the galvanometer 48 and thence through the resistance 45. This current flowing through the galvanometer 48 will cause the needle thereof to deflect in one direction, to the right for example, from its zero center position and this deflection may be used as an indication of the fact that the signals as picked up by the antenna are in accordance with the assumptions upon which the preceding description has been based; namely, that the plane or vehicle P is to be left of the "on course" zone and in the area 3 so that the A signal predominates over the B signal.

Assuming now that the plane P crosses the "on course" zone and shifts to the right of the desired course so as to be positioned within the area 4. Reference to Fig. 2 will indicate that the B signals will predominate over the A signals with the result that the voltage which is applied to the primary portion of the winding of the auto-transformer 39 will be 180° out of phase with that represented by the curve 51 in Fig. 3 and will instead correspond to the curve 53 of Fig. 4.

Similarly, the voltages applied to the rectifiers 42 and 43 will be reversed from that described in the preceding paragraphs with the result that the rectifier 42 will be blocked, the rectifier 43 will pass current, and current will flow from the rectifier 43 and through the galvanometer 48 and thence through the resistance 44 to ground. The direction of current flow through the galvanometer is thus reversed and its deflection from zero center will likewise be to the left or opposite to that resulting from the conditions assumed in the preceding description. It will thus be seen that the position of the galvanometer needle to the right or to the left of its zero center will correspondingly indicate the direction in which the vehicle must be moved to bring it back to the desired course.

Similarly, if the vehicle is "on course," the galvanometer will read zero. This is for the reason that the rectification of the A and B signals effected by the rectifiers 29 and 31 will provide across the resistance 34 a pure direct current so that no alternating voltage will be applied to the auto-transformer 39. Consequently no current can flow in the circuits associated with the galvanometer 48 and the galvanometer will, of course, indicate zero or its center position.

From the foregoing it will be observed that I have provided a novel receiving and indicating apparatus for use with radio beacon systems of the equi-signal type, which apparatus is particularly adapted to provide a sensitive and dependable visual indication of the location of the aircraft or other vehicle with respect to the course which is defined by the radio beacon system.

Attention is directed to the fact that the device of my invention is adapted for use with substantially any equi-signal radio beacon system, the only requirement being that the keying of the transmitters employed in such system be such that the time of transmission of one of the signals exceeds the time of transmission of the other. By a relatively small and inexpensive change, the presently commercial radio beacon systems of the A—N type could be readily adapted for use with the radio beacon receiver and indicator of my invention, this small change comprising merely an adjustment of the keying sequence to provide for the difference in time of operation above mentioned.

While I have shown and described the preferred embodiment of my invention, I do not desire to be limited to any of the details of construction shown or described herein, except as defined in the appended claims.

I claim:

1. In a device for visually indicating the predominance in intensity of one of two radio signals of like frequency which are produced alternately in a recurring time cycle and for unequal periods in each cycle, the combination of: a radio frequency amplifier for receiving and amplifying said signals; rectifying means for rectifying said amplified signals to produce a direct potential which pulsates in accordance with the alternate production of said signals; filter means for separating the alternating potential and direct potential components of said pulsating potential; means for reversing the phase of said alternating potential component; a pair of half wave rectifiers connected to separately rectify said alternating potential component and said reversed phase alternating potential component; a separate load for each of said rectifiers; and a low resistance indicating galvanometer connected between the load sides of said rectifiers.

2. In a device for visually indicating the predominance in intensity of one of two radio signals of like frequency which are produced alternately in a recurring time cycle and for unequal periods in each cycle, the combination of: a radio frequency amplifier for receiving and amplifying said signals; rectifying means for rectifying said amplified signals to produce a direct potential which pulsates in accordance with the alternate production of said signals; filter means for separating the alternating potential and direct potential components of said pulsating potential; means for reversing the phase of said alternating potential component; a pair of half wave rectifiers connected to separately rectify said alternating potential component and said reversed phase alternating potential component; a separate resistance load for each of said rectifiers; a condenser connected in parallel with each of said resistance loads and having capacities sufficient to substantially maintain the potential across said resistance loads during the non-rectifying half cycles of said half wave rectifiers; and a low resistance indicating galvanometer connected between the load sides of said rectifiers.

3. In a device for visually indicating the predominance in intensity of one of two radio signals of like frequency which are produced alternately in a recurring time cycle and for unequal periods in each cycle, the combination of: a radio frequency amplifier for receiving and amplifying said signals; a local oscillator for producing an alternating potential having a frequency slightly different from that of said received signals; means for combining and rectifying said received signals and the alternating potential produced by said local oscillator; means for selectively amplifying the difference-frequency signal resulting from said rectification; a second rectifying means connected to rectify said difference-frequency signal and produce a pulsating direct current signal having an alternating component which is proportional to the variations of the amplitude of said difference-frequency signal; means for separating said alternating component from said pulsating current; means for reversing the phase of said alternating component; a pair of half wave rectifiers connected to separately rectify said alternating component and said reversed phase alternating component; and an output circuit common to said pair of half wave rectifiers and including a galvanometer and a pair of shunt connected condensers and resistors, said meter being so connected as to selectively indicate the difference in the rectified current output from said pair of half wave rectifiers.

4. The method of ascertaining the polarity of the maximum potential peak of an alternating potential of asymmetrical wave form which consists in reversing the phase of said alternating potential, subjecting said alternating potential and the reversed phase alternating potential to separate half wave rectifications, and comparing the direct potential produced by each rectification.

5. A device for visually indicating the polarity of the maximum potential peak of an alternating potential of asymmetric wave form comprising means for reversing the phase of said alternating potential; a pair of half wave rectifiers connected to separately rectify said alternating potential and said reversed phase alternating potential; a separate load for each of said rectifiers; and a low resistance indicating galvanometer connected between the load sides of said rectifiers.

WILLIAM J. O'BRIEN.